June 4, 1968  R. KAUFMAN  3,386,194
OPTICAL VIEWER
Filed April 5, 1965  2 Sheets-Sheet 1
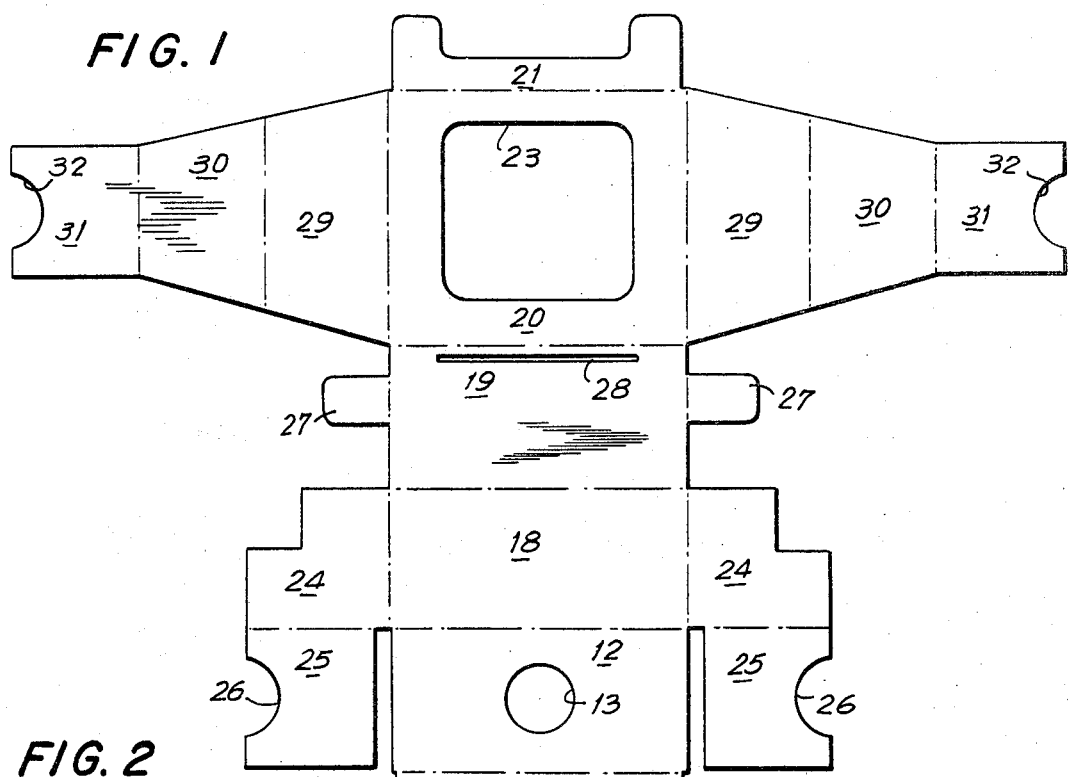
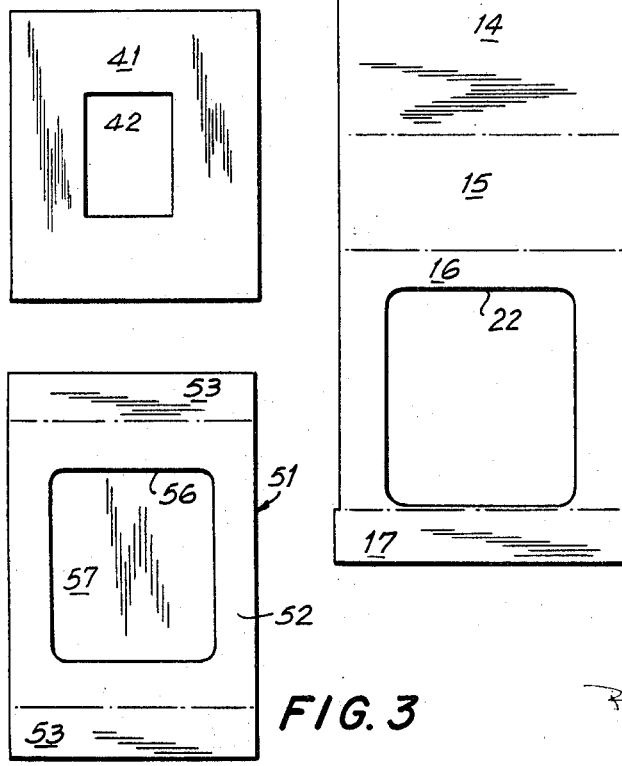
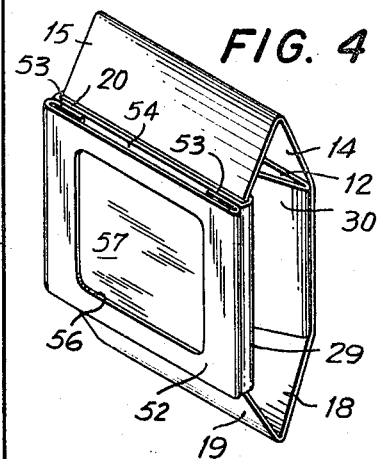
INVENTOR.
ROBERT KAUFMAN
BY
Blum, Moscovitz, Friedman, Blum & Kaplan
ATTORNEYS June 4, 1968  R. KAUFMAN  3,386,194
OPTICAL VIEWER
Filed April 5, 1965  2 Sheets-Sheet 2
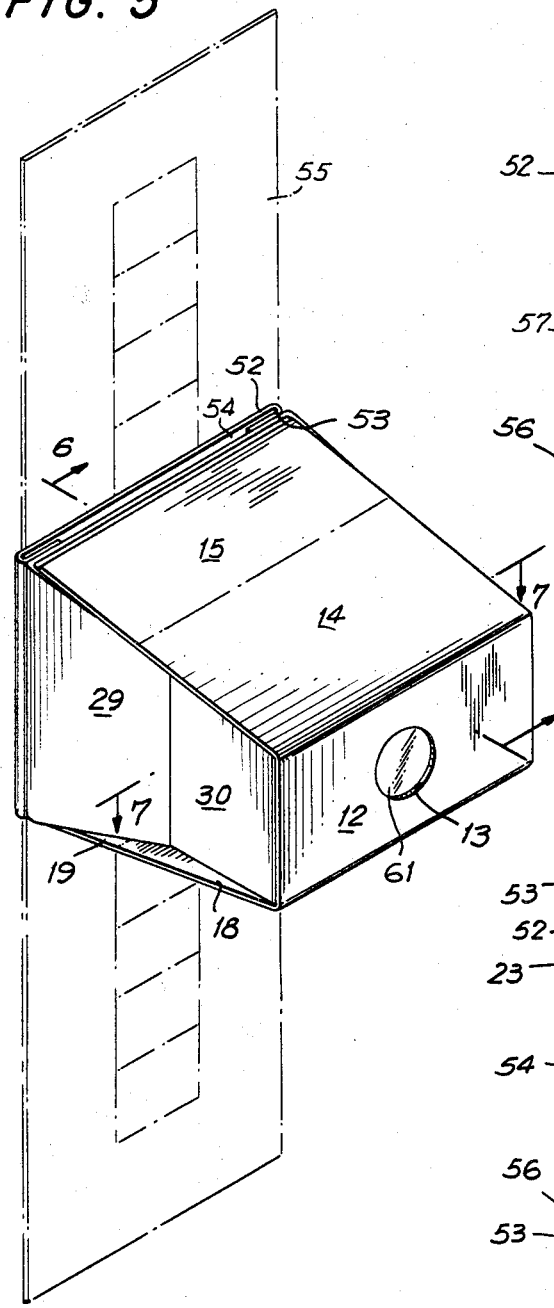
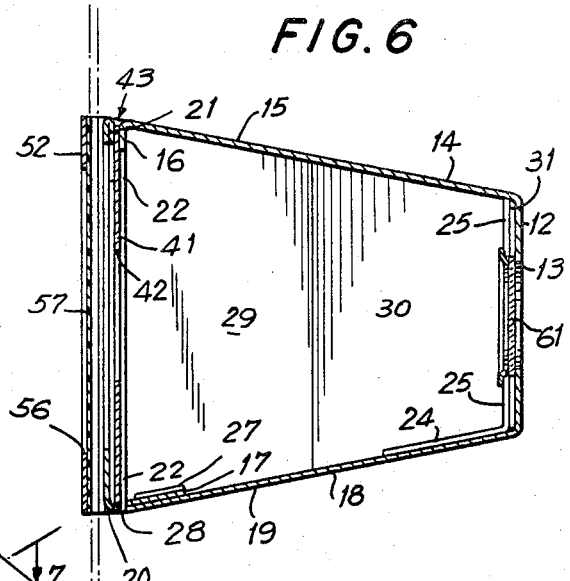
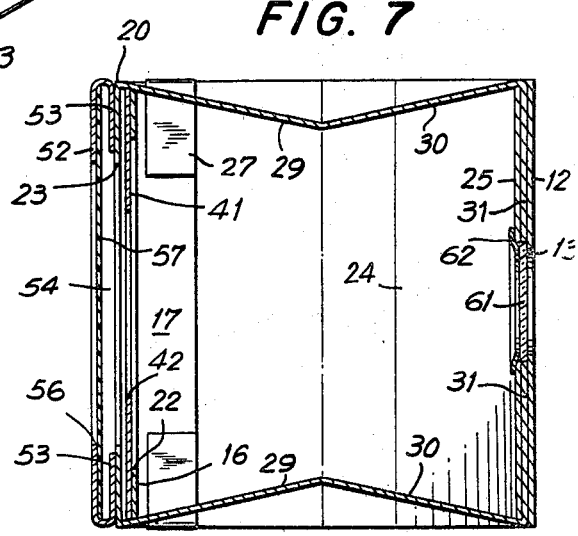
INVENTOR.
ROBERT KAUFMAN
BY
ATTORNEYS 3,386,194
OPTICAL VIEWER
Robert Kaufman, New York, N.Y., assignor to The Taylor-Merchant Corporation, New York, N.Y., a corporation of New York
Filed Apr. 5, 1965, Ser. No. 445,520
2 Claims. (Cl. 40—63)

ABSTRACT OF THE DISCLOSURE

A foldable optical viewer of the type having a lense carrying rear panel and a front panel separated by foldable top, bottom and side panels in which the viewer includes a pocket defining panel which extends from the top panel and overlies the front panel without being secured thereto to form a pocket between the pocket defining panel and the front panel. The viewer may include a film strip aperture in the bottom panel at the base of the pocket.

---

This invention relates generally to an optical viewer for the viewing of film strips, slides, microfilm, and other forms of transparencies. The invention is more particularly directed to an inexpensive, portable and collapsible viewer of improved construction which increases the versatility and usefulness of the viewer.

Collapsible viewers of this general type are known in the art but are generally limited in the size and type of transparencies capable of being inserted in the viewer for viewing. Such viewers have been designed for use with slides or film strips having frames of a particular size.

Accordingly, the principal object of this invention is to provide an inexpensive collapsible viewer which can accommodate a range of sizes and types of film strips and slides.

Another object of the invention is to provide an improved viewer having means for framing transparencies of various sizes.

Still other objects and advantages of the invention will in part be obvious and will in part be apparent from the specification.

Generally speaking, in accordance with the invention, a viewer constructed of folded paperboard or other suitable material is provided with a pair of film receiving pockets or channels for guiding of the various transparencies to be viewed. Where multiple frame film strips mounted in a holder are to be viewed, the holder is adapted to pass through an open-ended guiding channel which permits the holder to be inserted through one end and pass through the opposite end. Where a single mounted transparency is to be viewed, a three-sided pocket is provided for receiving and orienting the mounted transparency, with means being provided at the base of the pocket for passage therethrough of a continuous film strip which is unmounted and therefore relatively narrow. The aforesaid pocket is also adapted for receiving a framer having an opening of a preselected size corresponding to the size of the frame on film strips having a plurality of frames thereby providing means for viewing of a single frame regardless of the size and number of frames on a film strip.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawings, in which:

FIG. 1 is a plan view of a blank from which the lens housing is formed;

FIG. 2 is a plan view of a framer adapted for use with the viewer of the present invention;

FIG. 3 is a plan view of a blank from which a guiding channel is formed;

FIG. 4 is a front perspective view of an optical viewer constructed in accordance with the invention, shown in a semi-collapsed condition;

FIG. 5 is a rear perspective view of an optical viewer constructed in accordance with the invention and being shown in an open position with a film strip key mounted therein for viewing;

FIG. 6 is a sectional view taken along line 6—6 of FIG. 5; and

FIG. 7 is a sectional view taken along line 7—7 of FIG. 5.

The viewer is primarily formed from a pre-cut and folded blank of flexible opaque material, such as paperboard, cardboard, plastic, metal or wood.

Referring to FIG. 1, the blank for a lens housing includes a rear panel 12 provided with a central lens aperture 13, a top rear panel 14, a top front panel 15, a pocket-defining panel 16, a tab 17, a bottom rear panel 18, a bottom front panel 19, a front panel 20, and a tab 21. Pocket-defining panel 16 and front panel 20 are provided with apertures 22 and 23 respectively, the apertures being at least as large as the size of the frame of the largest transparency to be accommodated in the viewer for viewing. Extending outwardly from each side of bottom rear panel 18 are securing panels 24 with rear panel securing portion 25 extending therefrom and having semicircular cutouts 26 adapted to register with lens aperture 13. Bottom front panel 19 is provided with outwardly extending tabs 27 and a film strip aperture 28 proximate to the junction of the bottom front panel with front panel 20.

Extending outwardly from opposite edges of front panel 20 are forward side panels 29, rearward side panel 30 and rear panel portions 31 also provided with semicircular cutouts 32 adapted to register with lens aperture 13. The junction lines between each of the aforesaid panels, tabs and portions define fold lines along which the various elements are folded for assembly of the lens housing. The various component sections are secured together by any suitable means such as gluing. The assembled position of the lens housing is best seen in the sectional views in FIG. 6 and 7. Note that the overlay of panels at the front and rear of the viewer provide for increased stiffness of the front and rear panels as compared with the top, bottom and side panels.

As shown in FIG. 2 a framer 41 blanked from a section of paperboard or the like is provided with a central aperture 42. Each viewer would be provided with a plurality of framers 41 having central apertures 42 of various preselected sizes corresponding to the size of a frame of, for example, 8 mm., 16 mm., etc. film. The front surface of pocket-defining panel 16 is not glued or otherwise secured to the rear surface of front panel 20 thereby defining a pocket 43 for insertion of a framed slide or an unmounted film strip. The relative position of panels 16 and 20 is maintained by tab 17 which is glued, as shown in FIG. 6, to bottom front panel 19 and tabs 27 which are secured over tab 17. For any size film, a suitable framer 41 is inserted in pocket 43 to provide framing for the transparency to be viewed.

Film strip aperture 28 is located at the bottom of pocket 43 to permit passage therethrough of a continuous, unframed, narrow film strip which can be inserted in the pocket and pulled through the viewer for sequential viewing of the frames.

A channel-defining blank 51 is shown in FIG. 3. It consists of a central panel 52 and oppositely extending tabs 53, the lines separating tabs 53 from panel 52 comprising fold lines. Channel-defining blank 51 is secured to the outer surface of front panel 20 as shown in FIGS. 6 and 7 thereby defining a through channel 54 for receiving a relatively wide, framed film strip or key such as that shown in phantom as 55 in FIG. 5. As in the case of a continuous film strip, a framer 41 having a suitably sized central aperture would be inserted in pocket 43 to frame for sequential viewing the single frames in film strip 55.

Blank 51 is provided with a central aperture 56 whose size is at least as large as apertures 22 and 23. Secured to central panel 52 over aperture 56 is a sheet 57 of translucent, light-diffusing material in order to diffuse the light passing through a transparency from an external light source.

A suitable lens 61 is secured over lens aperture 13 by any suitable means such as a circular band of lightweight paper 62 glued to the inner surface of rear panel portions 31.

The optical viewer constructed as hereinabove described is small, lightweight and easily folded as shown in FIG. 4. The foldability of the viewer also provides for movement of the lens toward and from the transparency during viewing in order that the transparency may be brought into focus by the operator.

With the viewer, multiple framed film strips in a mount or key can be supported in and passed through channel 54, with framing being accomplished by insertion of a framer 41 having a central aperture of correct size in pocket 43. Single slides, such as a 35 mm. mounted transparency, are viewed by insertion of the slide in pocket 43. Here again, framer 41 can be used, if required. Also, continuous, unmounted film strips can be viewed by insertion thereof in pocket 43 with the film strip passing through aperture 28. Film strips having a plurality of frames will also preferably be used in conjunction with framer 41.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. In a viewer of the type having a lens-carrying rear panel and a front panel separated by foldable top, bottom and side panels, said front panel including a window opening, the improvement comprising a channel defining panel having tabs extending from two opposite edges thereof, said tabs being folded at an angle of substantially 180° to overlie said channel-defining panel, the outer surfaces of said tabs being secured to the outer surface of said front panel to form a through channel between said channel-defining panel and said front panel, said channel-defining panel including a window opening substantially in register with the window opening in said front panel, a pocket-defining panel extending from said top panel and adapted to overlie said front panel without being secured thereto to form a pocket between said pocket-defining panel and said front panel, said pocket-defining panel including a window opening, and tab means extending from said pocket-defining panel and secured to said bottom panel slightly spaced from said front panel to form the only fixed connection of said pocket-defining panel to said viewer relative to said front panel.

2. In a viewer of the type having a lens-carrying rear panel and a front panel separated by foldable top, bottom and side panels, said front panel including a window opening, the improvement comprising a pocket-defining panel extending from said top panel and adapted to overlie said front panel without being secured thereto to form a pocket between said pocket-defining panel and said front panel, said pocket-defining panel including a window opening, tab means extending from said pocket-defining panel and secured to said bottom panel proximate to said front panel to form the only fixed connection of said pocket-defining panel to said viewer relative to said front panel, means defining a film strip aperture in said bottom panel between said pocket-defining panel and said front panel at the bottom of said pocket, a framer mounted in said pocket between said pocket-defining panel and said front panel, said framer being provided with a window opening in register with the window openings in said pocket-defining and front panels and being of a preselected size, and a channel-defining panel having tabs extending from two opposite edges thereof, said tabs being folded at an angle of substantially 180° to overlie said channel-defining panel, the outer surfaces of said tabs being secured to the outer surface of said front panel to form a through channel between said channel-defining panel and said front panel, said channel-defining panel including a window opening substantially in register with the window opening in said front panel.

References Cited

UNITED STATES PATENTS

| | | | |
|---|---|---|---|
| 2,789,460 | 4/1957 | Kaufman | 40—63 |
| 2,794,367 | 6/1957 | Turner | 40—63 |
| 2,859,548 | 11/1958 | Pruner | 40—63 |
| 2,933,015 | 4/1960 | Somach | 40—63 |

LAWRENCE CHARLES, *Primary Examiner.*